Dec. 25, 1934.  R. P. LA PORTE  1,985,734
WELDING TOOL
Filed June 3, 1932
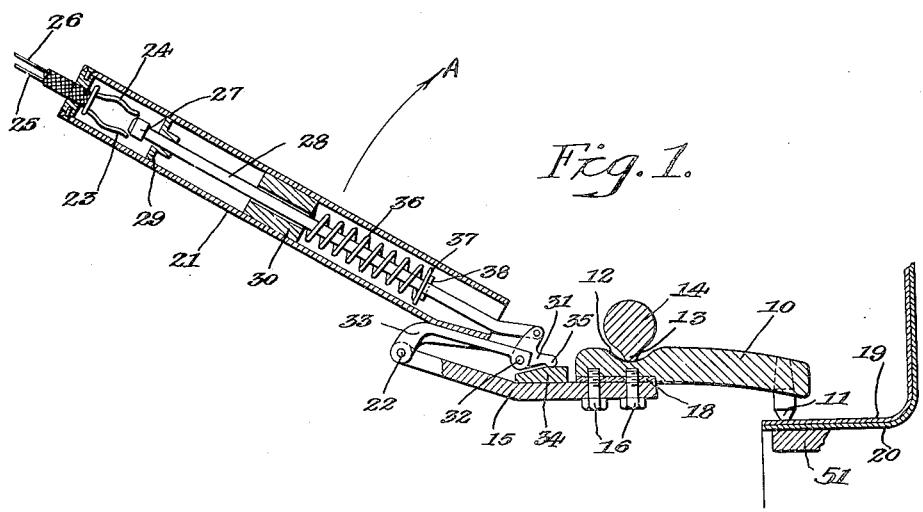
Fig. 1.
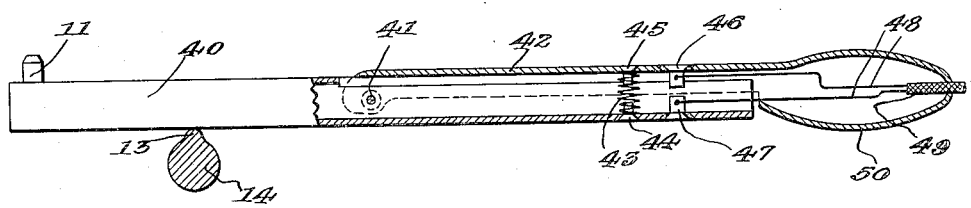
Fig. 2.
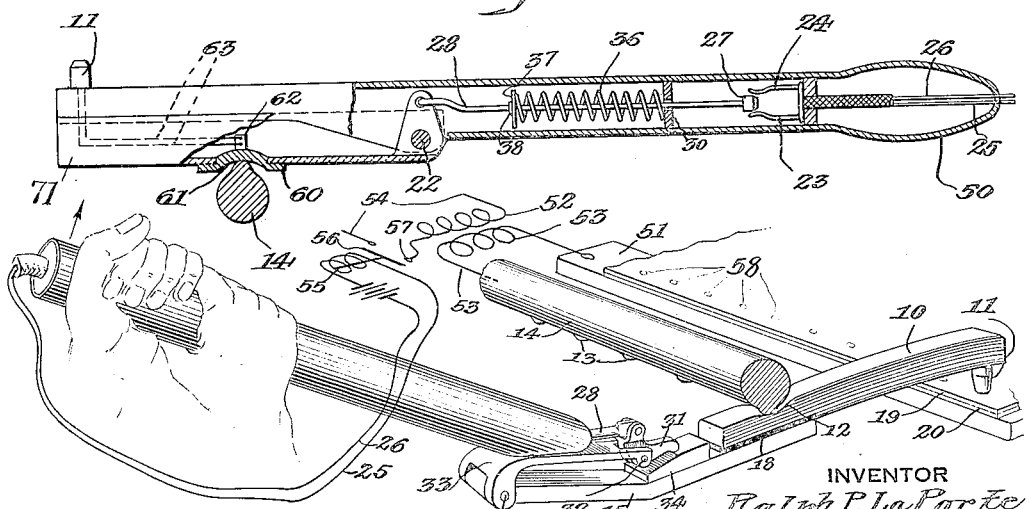
Fig. 3.
Fig. 4.
INVENTOR
Ralph P. LaPorte
BY
John P. Tarbox
ATTORNEY Patented Dec. 25, 1934

1,985,734

UNITED STATES PATENT OFFICE 1,985,734

WELDING TOOL

Ralph P. La Porte, Philadelphia, Pa., assignor to Edward G. Budd Manufacturing Company, Philadelphia, Pa., a corporation of Pennsylvania Application June 3, 1932, Serial No. 615,168

9 Claims. (Cl. 219—4)

My invention relates to welding and more especially to the construction of a portable tool adapted for spot welding operations wherein a uniform electrode pressure is vitally essential at each operation.

In the fabrication of commercial structures by means of production methods, wherein spot welding is used to secure together co-operating sheet metal parts, it is extremely essential and in fact definitely necessary that each and every consecutive spot weld be created with a uniform predetermined electrode pressure.

I also construct one part of the welding apparatus in the form of a bus bar adjacent the work with a plurality of spaced stations thereon adapted for co-operation with the portable tool thereby to space the spot welds upon the work.

In order to attain the above desired conditions during manufacturing production operations, I have constructed a portable tool capable of insuring the attainment of the above enumerated desirable objects and others incidental thereto.

This device comprises substantially a portion carrying a welding electrode, another portion comprising a handle and interiorly of said parts a contact which is adapted to be closed at each consecutive condition of predeterminate electrode pressure, upon the actuation of a yieldable member which is interposed between the two portions of the device.

My invention will be better understood from the following description when considered in connection with the accompanying drawing and its scope will be pointed out in the appended claims.

In the accompanying drawing wherein like ordinals represent corresponding parts in the various figures, Figure 1 is a cross section elevation of my apparatus shown in co-operating position with a power bus and work piece.

Figure 2 is a similar device incorporating a slightly different construction.

Figure 3 is likewise a slightly modified form.

Figure 4 is a perspective showing the co-operating parts in assembled position.

Referring to the figures in more detail, I have shown an extremely practical and useful form of my device in Figure 1. This comprises essentially a portion 10 bearing at its outer extremity a removable or replaceable electrode member 11, and linearly spaced from said electrode and upon said conducting portion a recess 12 adapted to receive one of a plurality of spaced raised portions 13 upon the power bus 14. Obviously the predeterminately spaced welding positions on the bus 14 may comprise indentations as well as projections. Other means for accomplishing the same result may be used, such as for example a plurality of slots or U-shaped devices adapted to receive the electrode bearing portion of the tool between the prongs and position it with respect to the work in that manner. Secured to the portion 10 is a structural part 15. The portions 10 and 15 are secured together by some common expedient such as bolts 16 or welds and have interposed therebetween a suitable insulating medium 18. The electrical operation of the parts so far described is essentially as follows: The contacting portion 10 is placed against the power bus 14 and the electrode 11 is forced against the nested co-extensive parts 19 and 20 of a work piece. When the power bus is energized a circuit path is obtained from the bus through the conducting member 10 to the electrode 11 and thence through the work pieces to be fastened together, to the opposite electrode.

Essentially the remaining portion of my device comprises a tubular member 21 which is pivotally connected to the member 15 at the point 22. Mounted interiorly of the tubular portion 21 is an electrical contact in the form of the plurality of contact members 23 and 24 having circuit connections 25 and 26 associated respectively therewith.

To complete the circuit connection between these two contacts a bridging member 27 is used. This member is carried upon a push rod 28 and insulated therefrom. The push rod passes through a plurality of bearings 29 and 30 of any suitable material and at the external extremity is pivotally connected to a cam 31 which is of substantially bell crank shape. The common point of the two arms of the cam member is secured pivotally at 32 to a portion of the pivot member 33 which mechanically connects the tubular portion to the member 15. Mounted upon the member 15 is a case-hardened steel member 34 which serves as a stop or abutment for the arm 35 of the cam. Also interiorly of the tubular member is a spring 36 abutting at one end against the bearing 30 as a limit stop and is associated co-operatively with the push rod 28 at its other extremity by means of a washer 37 secured to the push rod by means of a pin 38.

The operation of my entire device is as follows: The work parts 19 and 20 are positioned co-extensively of each other in the machine adjacent to the irregular and elongated bus bar 14. This bus bar is linearly substantially co-extensive with and spaced from the parts of the work to be joined together. The operator of the apparatus positions the portable tool against the bus bar as a fulcrum with the electrode 11 against the work. After exerting a force in the direction of the arrow A upon the tool the tubular portion 21 pivots about the point 22 and continues to act against the yielding resistance of the spring 36 due to the pivoting of the cam about the hardened surface of the member 34. After the predetermined electrode pressure is obtained, the spring 36 will completely yield allowing the contacts 23 and 24 to be bridged by the member 27. At this point, the closing of the circuit containing the contact 27, actuates any suitable mechanism to close the welding circuit thereby energizing the bus 14 which is at other times normally inactive. The weld takes place and the tool is removed and placed against the bus at the next spaced point similar to the point 13. The next consecutive weld is likewise formed in a manner corresponding to that just described.

It is readily seen that an operator may use the device illustrated and obtain a uniform product without his having any especial skill with regard to welding apparatus.

I have also illustrated several modifications of my device in Figures 2 and 3 which are equally adapted to the solution of the problem presented and are substantial equivalents of the disclosure of Figure 1. In Figure 2 is a member, adapted to be fulcrumed about a bus bar 14, having at its outer extremity the electrode member 11. A conducting path between the bus bar 14 and the electrode 11 is through the member 40. The member 40 is substantially tubular in form and is pivoted appropriately thereupon at the point 41 and arm 42. The member 42 and a member 40 are maintained apart by means of a suitable compression spring 43 mounted interiorly of them and secured by means of members 44 and 45. Spaced from the spring member and likewise carried upon the respective parts of the tool are contact members 46 and 47 insulated from the members and connected by means of the wires 48 to the control mechanism of the welding circuit. Any flexible cable 49 passing outside of the handle 50 may be used for this purpose. This modified construction is essentially the same as that disclosed in Figure 1 with the exception, of course, of mechanical parts.

In Figure 3 the device, substantially the same as that of Figure 1, is shown but in this instance the portion 71 which fulcrums about the bus bar 14 is normally of insulating material having a conducting contacting portion 60 with a recess 61 therein adapted for co-operation with the buttons 13 on the bus bar. A conducting pig-tail 63 connected to the member 62 is adapted to complete the welding circuit from contact 60 to the electrode 11. The pivotal connections between the two parts and the push rod are substantially the same and are therefore correspondingly numbered with like ordinals. Further explanation of this modified form is deemed non-essential.

In the remaining figure of the drawing the apparatus is shown in perspective for the purpose of more readily understanding the operation of the device with some parts being shown schematically. The welding tool is shown in the initial position with the electrode 11 bearing upon the upper sheet 19. The lower sheet 20 rests upon an electrode 51 connected to the secondary of the transformer 52 by means of connections 53 one of which goes to bus bar 14 and one to the electrode 51. The primary side of the transformer 52 is energized by leads 54 when actuated in accordance with the predetermined pressure applied at the electrode. This pressure is obtained by exerting upon the tool in the direction of the arrow a force after having it in position with respect to the work piece and the power bus 14. After a sufficient pressure has been placed upon the electrode by the push-up in the direction of the arrow the circuit through the leads 25 and 26 is closed energizing the relay 55. The energization of the relay 55 causes the bridging member 56 to close the primary circuit between the contacts 57. At this time the welding power from the bus 14 is transmitted through the portion 10 bearing the electrode 11, thereby forming a weld. It may readily be seen that welds 58 previously made upon the adjoining edges of the two sheets are uniformly spaced in accordance with the working or welding positions 13 of the power bus. It is also obvious that the other modified forms will operate in the same manner. As to which member carries the contacts this is immaterial inasmuch as the desired feature is to have the device operate and not as to which particular portion carries the contact.

The embodiment of the invention illustrated and described herein has been selected for the purpose of clearly setting forth the members involved. It is readily apparent however, that the invention is susceptible of being modified to meet the different conditions encountered in its use and I therefore, aim to cover by the appended claims the modifications herein shown and all other modifications within the true spirit and scope of my invention.

What I claim is:

1. A portable spot welding tool adapted to fulcrum about an elongated power bus comprising a portion adapted to pivot upon said bus and bearing an electrode point in circuit connection with said pivoting portion, means comprising a tubular arm secured pivotally to said electrode bearing portion, means controlling the energization of said bus and mounted interiorly of said tubular arm, and yieldable means interposed between said arm and said electrode bearing portion arranged to initiate said bus energization means in accordance with predeterminate pressure upon the electrode point of said welding tool.

2. A hand spot welding tool comprising an electrode bearing portion and a tubular handle portion pivoted thereto, means interiorly of said tubular portion arranged to control a welding circuit, and means interposed between said portions including a yielding member arranged to actuate said circuit controlling means in accordance with a predeterminate electrode pressure.

3. A portable spot welding tool adapted to create a uniform electrode pressure comprising in combination, an electrically conducting portion bearing an electrode, adapted for fulcrumed conducting association with a co-operating power bus, a tubular portion pivotally associated with said electrode bearing portion carrying interiorly thereof a circuit controlling device, and yieldable means associated with said portions and adapted to actuate said device in response to a predeterminate actuation of said yieldable means.

4. A hand spot welding tool comprising, in combination, an electrode member carrying an electrode point, an insulating handle, said handle and said electrode interconnected by a pivoted member, a control switch interiorly of said handle and a controlling contact yieldably spaced from said switch and arranged to close said control switch upon the pivoting action of said handle in respect to said electrode.

5. A portable welding tool having an electrode bearing portion adapted to be fulcrumed about a power carrying bus, a handle pivotally mounted upon said electrode bearing portion for manually exerting pressure on the work to be welded, resilient means resisting pivotal movement of said handle with respect to said electrode bearing portion, and means controlled by said resilient means for completing the welding circuit.

6. A portable welding tool having an electrode bearing portion adapted to be fulcrumed about a power carrying bus, a handle pivotally mounted upon said electrode bearing portion for manually exerting pressure on the work being welded, resilient means resisting pivotal movement of said handle with respect to said electrode bearing portion and a switch carried by said handle for completing the welding circuit, said switch actuated by a predetermined compression of said resilient means.

7. A portable welding tool having an electrode bearing portion adapted to be fulcrumed about a fixed support and forced into engagement with parts to be welded, a handle associated with said tool having resilient means for transmitting force exerted on said handle to said parts to be welded and a switch for closing the welding circuit actuated by said resilient means whereby said welding circuit is closed upon the attainment of a predetermined welding pressure.

8. A portable welding tool having an electrode bearing portion adapted to be fulcrumed about a fixed support and forced into engagement with parts to be welded, a handle associated with said electrode bearing portion having resilient means for transmitting force exerted on said handle to said parts, and a switch for closing the welding circuit having a stationary member and a member movable in accordance with the force transmitted to said work by said resilient means, whereby said welding circuit will be closed upon the attainment of a predetermined welding pressure.

9. A portable welding tool having an electrode bearing portion adapted to be fulcrumed about a fixed support and forced into engagement with parts to be welded, a handle associated with said electrode bearing portion having resilient means for transmitting force exerted on said handle to said parts, and a switch for closing the welding circuit, said switch having a stationary contact and a movable contact cooperating with said resilient means whereby as said resilient means is compressed a predetermined degree, said contacts will come into engagement completing said welding circuit.

RALPH P. LA PORTE.